US 8,544,011 B2

(12) United States Patent
Tanikawa

(10) Patent No.: US 8,544,011 B2
(45) Date of Patent: Sep. 24, 2013

(54) GENERATION AND CONCURRENT EXECUTION OF A VIRTUAL TASK IN AN EXECUTION ORDER DETERMINING SYSTEM

(75) Inventor: Tadao Tanikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 768 days.

(21) Appl. No.: 12/675,466

(22) PCT Filed: Jun. 25, 2009

(86) PCT No.: PCT/JP2009/002915
§ 371 (c)(1),
(2), (4) Date: Feb. 26, 2010

(87) PCT Pub. No.: WO2010/001555
PCT Pub. Date: Jan. 7, 2010

(65) Prior Publication Data
US 2010/0231959 A1 Sep. 16, 2010

(30) Foreign Application Priority Data
Jun. 30, 2008 (JP) .................................. 2008-170070

(51) Int. Cl.
*G06F 9/46* (2006.01)
(52) U.S. Cl.
USPC ........................................................ 718/102
(58) Field of Classification Search
None
See application file for complete search history.

(56) References Cited

U.S. PATENT DOCUMENTS

| 4,980,824 | A | * | 12/1990 | Tulpule et al. ................. 718/106 |
| 5,081,577 | A | * | 1/1992 | Hatle ................................. 710/7 |
| 5,537,560 | A | * | 7/1996 | Boggs et al. .................... 712/245 |
| 5,881,283 | A | * | 3/1999 | Hondou et al. ................. 718/100 |
| 5,999,987 | A | * | 12/1999 | O'Farrell et al. .............. 719/330 |

FOREIGN PATENT DOCUMENTS

| JP | 5-290003 | 11/1993 |
| JP | 8-286958 | 11/1996 |
| JP | 9-330287 | 12/1997 |
| JP | 2001-184204 | 7/2001 |
| JP | 2006-185229 | 7/2006 |

OTHER PUBLICATIONS

International Search Report issued Aug. 18, 2009 in International (PCT) Application No. PCT/JP2009/002915.

* cited by examiner

*Primary Examiner* — Meng An
*Assistant Examiner* — James J Lee
(74) *Attorney, Agent, or Firm* — Wenderoth, Lind & Ponack, L.L.P.

(57) ABSTRACT

A job control information storing section stores execution conditions under which execution of tasks is started, and an execution order of the tasks. A job executing section executes the tasks. A job execution administering section monitors a state of the task being executed to detect the task whose state is shifted to a process standby state of waiting for a response from another one of the tasks, based on the execution conditions, and responds to a request of executing the another task from the task whose state is shifted, in response to accepting the request from the task whose state is shifted. A virtual task generating section generates a virtual task as a copy of the task whose state is detected to be shifted. A virtual task registering section adds the virtual task to the execution order to concurrently execute the virtual task with the task whose state is shifted.

7 Claims, 9 Drawing Sheets

FIG. 3

| ACTIVATION ORDER | TASK NAME | TASK EXECUTION CONDITION |
|---|---|---|
| APPLICATION A | INITIALIZATION START | — |
| | RPC ACCEPTANCE START | — |
| APPLICATION B | INITIALIZATION START | — |
| | DISPLAY SETTING | APPLICATION A:RPC ACCEPTANCE START |
| | . . . | . . . |

201 — ACTIVATION ORDER
202 — TASK NAME
203 — TASK EXECUTION CONDITION

FIG. 4

| | | | 301 | 302 |
|---|---|---|---|---|
| 311 | JOB X | JOB START | START TIME INPUT INFORMATION A | — |
| 312 | TASK Y | TASK START | START TIME INPUT INFORMATION B | — |
| 313 | TASK Y | TASK END | — | END STATE A |
| 314 | JOB X | JOB END | — | END STATE B |

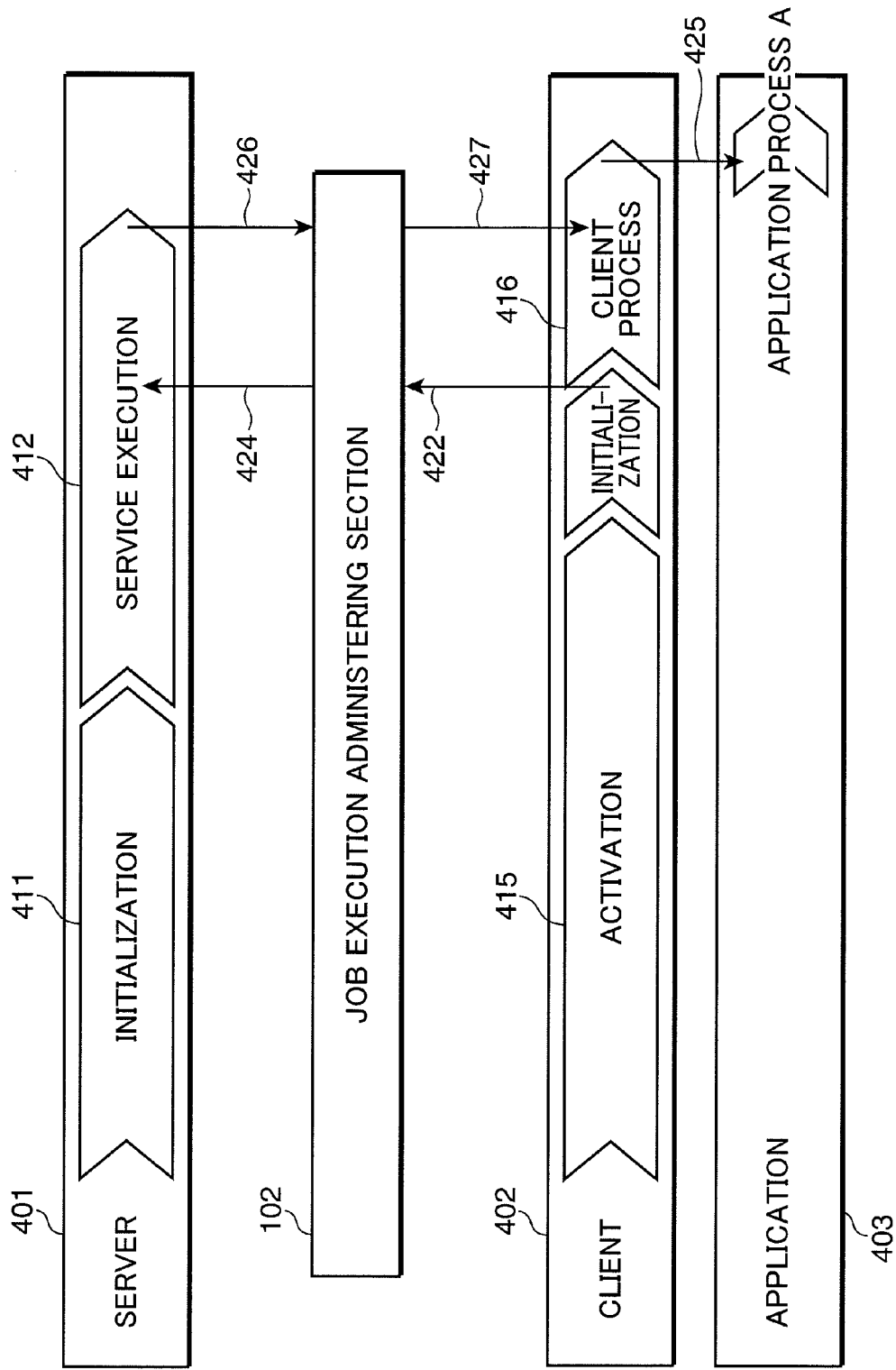

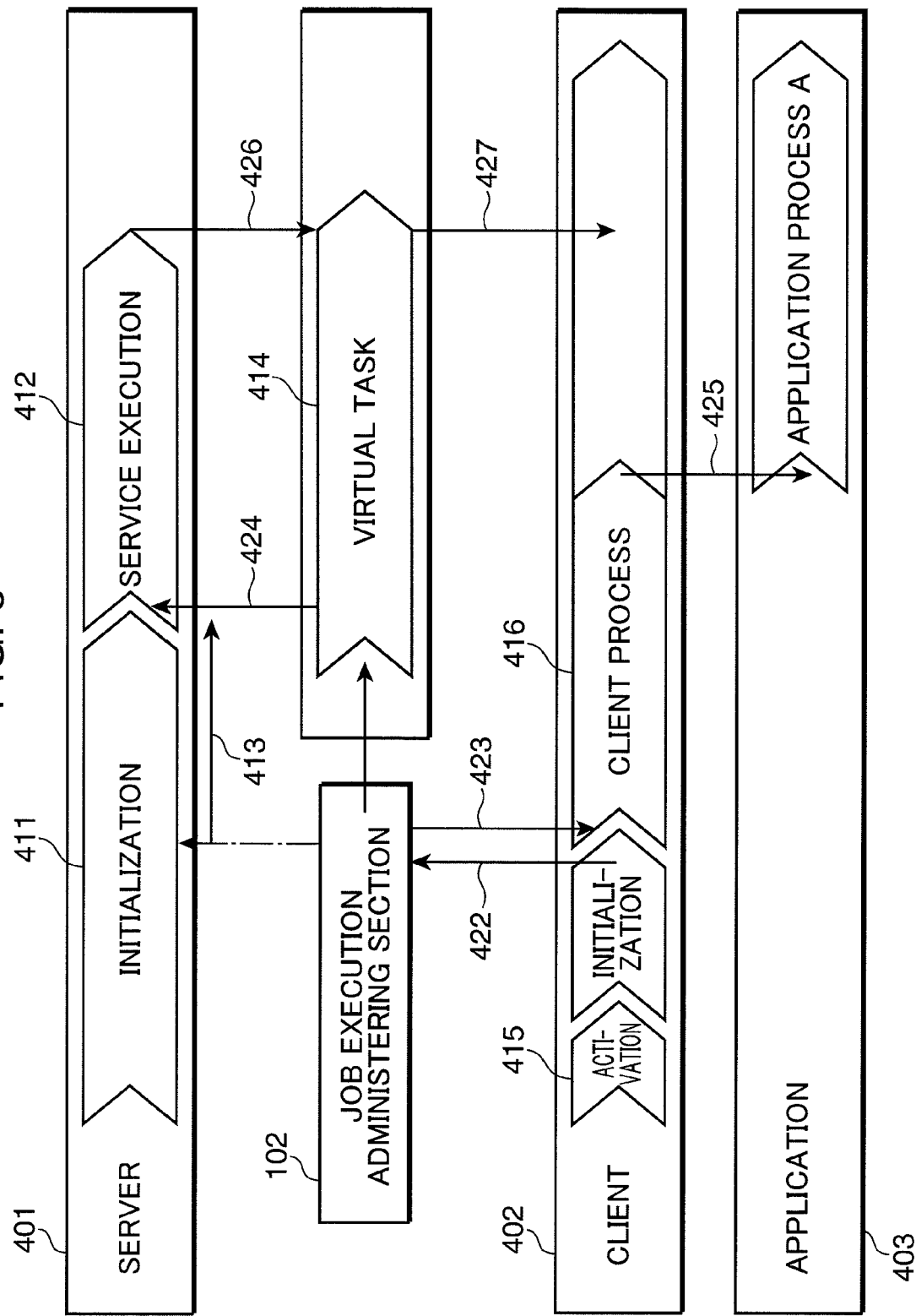

GENERATION AND CONCURRENT EXECUTION OF A VIRTUAL TASK IN AN EXECUTION ORDER DETERMINING SYSTEM

TECHNICAL FIELD

The present invention relates to an execution order determining device, an execution order determining program, an execution order determining circuit, and an information processing device for determining an execution order of concurrently executable tasks, and more particularly to an execution order determining device, an execution order determining program, an execution order determining circuit, and an information processing device for efficiently carrying out scheduling of tasks depending on a change in hardware configuration.

BACKGROUND ART

Conventionally, in an information processing device as represented by e.g. a digital household electric appliance or a mobile phone, multitudes of tasks are constantly executed or activated on a computer system to realize a variety of functions.

In recent years, services to be provided by the information processing device have been versatile, as the network of the information processing device has been developed, and the user request has been upgraded. As the user request is upgraded, the number of jobs and tasks to be executed by the information processing device, and the throughput thereof are increased, and the processing contents of jobs and tasks tend to be complicated.

In order to cope with an increase in the number of jobs and tasks, and the throughput thereof, a computer system incorporated with CPUs (Central Processing Units), or a single CPU capable of concurrently executing computations is configured. Thus, jobs and tasks are concurrently executed on the computer system.

In the computer system, it is necessary to configure an efficient job and task scheduling in order to acquire a processing time suitable for the calculation capability of the computer system. In particular, in a computer system capable of concurrently executing tasks, since the tasks are executed independently of each other, synchronous designing between jobs and between tasks, or determining an execution order is an important factor for reducing a process standby time.

In particular, in a process whose execution is predefined in a system, such as a system activation process, efficiently determining an execution order of jobs and tasks is essentially important to reduce a time required for activating the system. In the specification, a process whose execution is predefined, such as a system activation process, is a process of shifting a system to a predetermined condition by repeating a predetermined process every time while cooperating jobs and tasks to each other.

Conventionally, as a method for determining an execution order of jobs in a computer system capable of concurrently executing the jobs, there has been proposed a method for reducing a processing time of an overall system by performing a simulation based on a past job execution log(see e.g. patent literature 1). A job of executing a batch process, which is a collective data process, is such that a predetermined process is executed with respect to a predetermined input file. The job does not depend on a start time. Thus, plural jobs are periodically repeated. A simulation is performed with respect to the job of this type, based on a past execution log. Then, scheduling of the jobs is performed prior to a job execution in a targeted computer system, or at the time of system designing, thereby reducing a processing time of the overall system.

In the conventional configuration, however, execution start conditions of the respective jobs are determined, using access log information of files to which an input/output operation has been performed during execution of each job, and execution times of the respective jobs are calculated based on execution log information. In other words, an execution start time of each job is calculated based on a past job execution result. As a result, in the case where the conventional configuration is observed from a viewpoint of a computer system of executing a process by these jobs, an execution order of jobs is determined by a static analysis using the already acquired log information. The conventional execution order determining method may cause a problem, in the case where a job whose processing time is changed depending on the amount of data to be processed, such as a file system checking process, in a computer system internally provided with a hard disk drive. In other words, the conventional art has drawbacks that it is impossible to obtain an optimum job execution start time with respect to each of the computer systems, based on execution times of the respective jobs included in execution log information, which has been collected at the time of system designing or system configuration, and it is impossible to determine an efficient execution order of jobs.

CITATION LIST

Patent Literature

Patent literature 1: JP Hei 8-286958A

SUMMARY OF INVENTION

In view of the above, an object of the invention is to provide an execution order determining device, an execution order determining program, an execution order determining circuit, and an information processing device that enable to efficiently carry out scheduling of tasks.

An execution order determining device according to an aspect of the invention is an execution order determining device for determining an execution order of concurrently executable tasks. The execution order determining device includes: a task control information storing section which stores execution conditions under which execution of the respective tasks is started, and an execution order of the tasks; a task executing section which executes the tasks in accordance with the execution order stored in the task control information storing section; a task execution administering section which monitors a state of the task being executed to detect the task whose state is shifted from an execution state indicating that a task is being executed to a process standby state of waiting for a response from another one of the tasks, based on the execution conditions stored in the task control information storing section; and a virtual task administering section which generates a virtual task as a copy of the task whose state is detected to be shifted to the process standby state by the task execution administering section. The task execution administering section responds to a request of executing the another task from the task whose state is shifted to the process standby state, in response to accepting the request from the task whose state is shifted to the process standby state, and the virtual task administering section adds the generated virtual task to the execution order stored in the task control information storing section to concurrently execute the virtual task with the task whose state is shifted to the process standby state.

According to the above arrangement, the task control information storing section stores the execution conditions under which execution of the respective tasks is started, and the execution order of the tasks. The task executing section executes the tasks in accordance with the execution order stored in the task control information storing section. The task execution administering section monitors a state of the task being executed to detect the task whose state is shifted from an execution state indicating that a task is being executed to a process standby state of waiting for a response from another one of the tasks, based on the execution conditions stored in the task control information storing section. The virtual task administering section generates a virtual task as a copy of the task whose state is detected to be shifted to the process standby state by the task execution administering section. The task execution administering section responds to a request of executing the another task from the task whose state is shifted to a process standby state, in response to accepting the request from the task whose state is shifted to the process standby state. Then, the virtual task administering section adds the generated virtual task to the execution order stored in the task control information storing section to concurrently execute the virtual task with the task whose state is shifted to the process standby state.

According to the invention, a task whose state is shifted to a process standby state is executed without shifting to the process standby state, by responding to a request of executing another task from the task whose state is shifted to a process standby state, in response to accepting the request from the task whose state is shifted to the process standby state, and a virtual task as a copy of the task whose state is shifted to the process standby state is concurrently executed with execution of the task. This enables to efficiently carry out scheduling of the tasks.

These and other objects, features and advantages of the present invention will become more apparent upon reading the following detailed description along with the accompanying drawings.

BRIEF DESCRIPTION OF DRAWINGS

FIG. 3 is a diagram showing an example of job control information stored in a job control information storing section in the first embodiment of the invention.

FIG. 4 is a diagram showing an example of log information stored in a job log storing section in the first embodiment of the invention.

FIG. 5 is a diagram showing an operation to be executed by the execution order determining device, in the case where a processing time required for initialization of a server is shorter than a processing time required for activating a client.

FIG. 6 is a diagram showing an operation to be executed by the execution order determining device, in the case where the hardware configuration is changed to remarkably reduce a processing time required for activating a client.

DESCRIPTION OF EMBODIMENTS

In the following, embodiments of the invention are described referring to the accompanying drawings. The following embodiments are merely examples embodying the invention, and do not limit the technical scope of the invention.

(First Embodiment)

Figure 1:
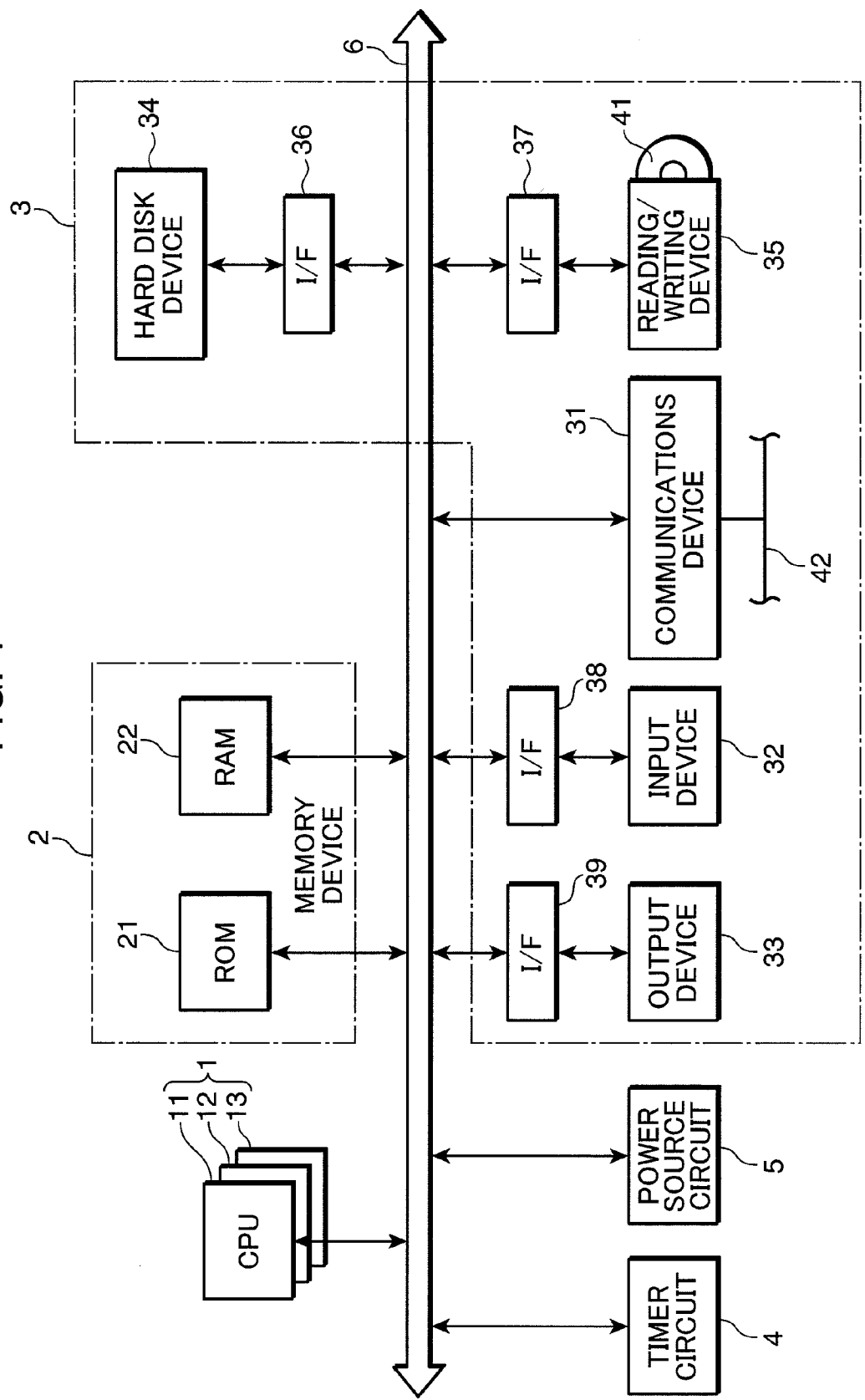
FIG. 1 is a diagram showing a hardware configuration of a computer provided with an execution order determining device in a first embodiment of the invention.

FIG. 1 is a diagram showing a hardware configuration of a computer provided with an execution order determining device in the first embodiment of the invention. The computer (hereinafter, also called as an information processing device) itself can be used by a user, but may be embedded in various electric devices. For instance, the computer may be a general-purpose computer such as a PC (Personal Computer). Further alternatively, the computer may be a portable communications terminal such as a PDA (Personal Digital Assistance) or a mobile phone; or an optical disc device which reads out information from an optical disc such as a BD and writes information into an optical disc.

The computer includes a CPU (Central Processing Unit) 1, a memory device 2, a peripheral device 3, a timer circuit 4, and a power source circuit 5. The peripheral device 3 includes a communications device 31, an input device 32, an output device 33, a hard disk device 34, and a reading/writing device 35. These devices are connected to each other through a bus line 6. The hard disk device 34, the reading/writing device 35, the input device 32, and the output device 33 are respectively connected to the bus line 6 through interfaces (I/Fs) 36, 37, 38, and 39.

The CPU 1 may be constituted of a single CPU or plural CPUs. For instance, the information processing device has CPUs 11, 12, and 13. The memory device 2 has an ROM (Read Only Memory) 21 and an RAM (Random Access Memory) 22.

The ROM 21 stores a computer program and data for defining an operation of the CPU 1. The computer program and the data may be stored in the hard disk device 34. The CPU 1 writes the computer program and the data stored in the ROM 21 or the hard disk device 34 into an RAM 22 as necessary, and executes a processing defined by the computer program. The RAM 22 also functions as a medium for temporarily storing data to be generated by execution of a process by the CPU 1. The ROM 21 includes a non-volatile memory and a storage medium capable of writing and holding storage contents even if the power source is cut off, such as a flash ROM. The RAM 22 includes a volatile memory and a storage medium incapable of holding storage contents if the power source is cut off.

The timer circuit 4 outputs a timer interrupt signal at a predetermined cycle. The power source circuit 5 controls on/off of an electric power to be supplied to the computer. In response to turning on of the electric power by the power source circuit 5, the computer system is activated.

The peripheral device 3 to be required by the computer is determined based on the function equipped in the computer. The hard disk device 34 writes a computer program or data into an unillustrated built-in hard disk, and reads out the computer program or the data from the hard disk. The reading/writing device 35 reads out a computer program or data recorded in a recording medium 41 such as a CD, a DVD, or a memory card. The communications device 31 exchanges a computer program or data with an external device or by itself through a communications line 42 such as a telephone line, a network line, a wireless communications, or an infrared communications. The input device 32 is e.g. a keyboard attached to a PDA, an input button attached to a mobile phone, or a detachable mouse or keyboard, and is adapted to input data and the like in response to accepting user's manipulation. The output device 33 is e.g. an LCD (Liquid Crystal Display), a CRT, or a speaker, and is adapted to display data, images, and the hie on a screen and/or output data and the like as sounds.

As described above, a computer program is supplied to the computer through the ROM 21, the hard disk device 34, or the recording medium 41 such as a flexible disk or a CD-ROM to operate the computer. A computer program may be supplied through a transmission medium such as the communications line 42. For instance, the computer program recorded in the recording medium 41 (CD-ROM) can be read out by connecting the reading/writing device 35 to the computer. The read-out computer program can be stored in the RAM 22 or the hard disk device 34.

In the case where a computer program is supplied from the ROM 21 as a program recording medium, the CPU 1 is operable to execute a process in accordance with the computer program by loading the ROM 21 in the computer. A computer program to be supplied through the transmission medium such as the communications line 42 is received through the communications device 31, and stored in e.g. the RAM 22 or the hard disk device 34. The transmission medium is not limited to a wired transmission medium, but may be a wireless transmission medium. Further alternatively, the transmission medium is not limited to a communications line, but may include a routing device for routing a communications line such as a router.

An execution order determining program is stored in e.g. the memory device 2, and realized by execution in cooperation with the CPU 1.

Figure 2:
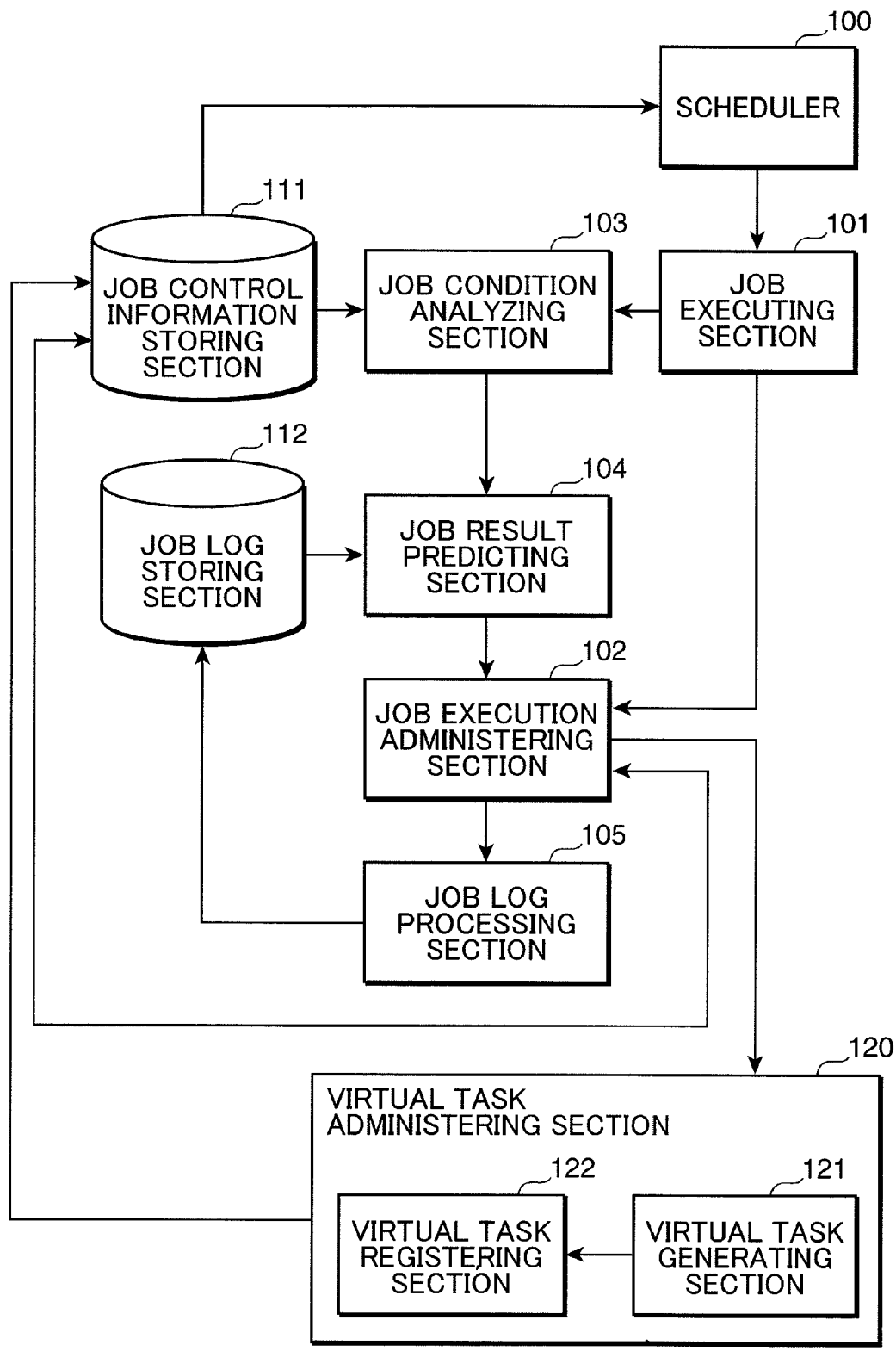
FIG. 2 is a block diagram showing an arrangement of the execution order determining device in the first embodiment of the invention.

FIG. 2 is a block diagram showing an arrangement of the execution order determining device in the first embodiment of the invention.

Referring to FIG. 2, the execution order determining device includes a scheduler 100, a job executing section 101, a job execution administrating section 102, a job condition analyzing section 103, a job result predicting section 104, a job log processing section 105, a job control information storing section 111, a job log storing section 112, and a virtual task administrating section 120.

In the specification, a job is a unit representing a series of processes to be executed by a computer, and a task is a unit representing a process obtained by segmentizing a series of processes i.e. a job. In other words, a job is constituted of tasks. The task in the claims embraces the job in terms of the above definition, and the task in terms of the above definition. In other words, the task in the claims represents a group of processes, and also represents each one of the processes.

The job control information storing section 111 holds job control information for designating a program to be executed or necessary file information in order to reserve execution of a job. The job control information includes an activation order of programs to be executed, and information necessary for analyzing an activation condition. The job control information may include identifiers for identifying tasks to be executed by the computer, task execution conditions as activation conditions, and an activation order of tasks, and any one of description formats may be usable.

FIG. 3 is a diagram showing an example of the job control information stored in the job control information storing section in the first embodiment of the invention.

The job control information storing section 111 administers, an activation order 201, a task name 202, and a task execution condition 203 in pair, as the job control information. In this example, two tasks i.e. initialization start, and RPC (Remote Procedure Call) acceptance start are executed in a predetermined order in the case where an application "A" is activated. Also, two tasks i.e. initialization start, and display setting are executed in a predetermined order in the case where an application "B" is activated. The display setting is set based on an activation condition that the RPC acceptance start process in the application "A" has already been executed.

The job control information storing section 111 stores the job control information, wherein the activation order 201, the task name 202, and the task execution condition 203 are correlated to each other, in the format of a table. The job control information storing section 111 stores the task names 202 and the task execution conditions 203 in the order of activation. The job control information storing section 111 stores the execution conditions under which execution of the respective tasks is started, and the execution order of tasks.

The scheduler 100 determines a task to be executed next in accordance with the job control information stored in the job control information storing section 111. The scheduler 100 determines the task to be executed next in accordance with the activation order included in the job control information. The scheduler 100 instructs the job executing section 101 to start execution of the determined task.

The job executing section 101 executes a targeted job and task in accordance with the instruction from the scheduler 100. The job executing section 101 executes the task determined by the scheduler 100. Specifically, the job executing section 101 executes a task in accordance with the execution order stored in the job control information storing section 111.

The job condition analyzing section 103 analyzes an execution condition and a dependency relation of a job and task, based on the job control information stored in the job control information storing section 111.

The job log storing section 112 stores log information including execution results indicating that the respective tasks and jobs have been executed, and logs of execution start and execution end of the respective tasks and jobs.

FIG. 4 is a diagram showing an example of the log information stored in the job log storing section in the first embodiment of the invention. The log information is constituted of a job start record 311, a task start record 312, a task end record 313, and a job end record 314. These records are generated by an event such as an execution start of a job, an execution start of a task, an execution end of a task, and an execution end of a job. Each of the records includes an identifier for identifying a targeted job or task, and information indicating execution start or execution end. The job start record 311 and the task start record 312 each includes start time input information 301 for discriminating a start condition at the time of execution. The task end record 313 and the job end record 314 each includes an end state 302 indicating that a job or task execution has ended normally or abnormally.

The job result predicting section 104 predicts an execution result of a job and task being executed or to be executed by using a log, and notifies the job execution administering section 102 of the predicted execution result. The job result predicting section 104 receives, from the job condition analyzing section 103, an execution condition and a dependency relation of a job and job step (task) which have been analyzed by the job condition analyzing section 103. The job result predicting section 104 predicts an execution result of the job and task being executed or to be executed, using the execution condition and the dependency relation of the job and job step which have been analyzed by the job condition analyzing section 103, and the log information stored in the job log storing section 112.

The job execution administering section 102 monitors a state of the task being executed; and detects a task whose state is shifted from an execution state indicating that a task is being executed to a process standby state of waiting for a response from another task, based on the execution conditions stored in the job control information storing section 111. The job result predicting section 104 predicts an execution result of the another task, based on the execution conditions stored in the job control information storing section 111, and the log information stored in the job log storing section 112, in response to detecting the task whose state is shifted to the process standby state by the job execution administering section 102.

The job execution administering section 102 monitors the job and task state, and notifies the job log processing section 105 of the job and task state. The job execution administering section 102 detects whether the job and task state is shifted to a task standby state (idle state), based on an execution condition or a dependency relation of a job and task. In response to detecting a shift to an idle state, the job execution administering section 102 receives the predicted execution result from the job result predicting section 104.

In the case where it is judged that the execution result predicted by the job result predicting section 104 indicates a normal end, the job execution administering section 102 replies that the execution of the task has ended normally, keeps the execution state of the task, and continues the processing of the job. On the other hand, in the case where it is judged that the execution result predicted by the job result predicting section 104 indicates an abnormal end, the job execution administering section 102 replies that the execution of the task has ended abnormally, and instructs to perform an error process.

Subsequently, the job execution administering section 102 instructs the virtual task administering section 120 to activate a virtual task, as a copy of the task which executes a process to be skipped by virtual setting of a job and task execution condition, or a process to be skipped by cancellation of a dependency relation.

Further, the job execution administering section 102 responds to a request of executing another task from a task whose state is shifted to a process standby state, in response to accepting the request from the task whose state is shifted to the process standby state. In performing this operation, the job execution administering section 102 responds to the request from the task whose state is shifted to the process standby state, using the execution result predicted by the job result predicting section 104.

The job log processing section 105 additionally records logs of execution start and execution end of a task and job in the job log storing section 112, using the job and task state notified from the job execution administering section 102.

The virtual task administering section 120 includes a virtual task generating section 121 and a virtual task registering section 122. The virtual task administering section 120 generates a virtual task, as a copy of the task whose state is detected to be shifted to a process standby state by the job execution administering section 102. The virtual task administering section 120 adds the generated virtual task to the execution order stored in the job control information storing section 111 to concurrently execute the virtual task with the task whose state is shifted to a process standby state. Further, the virtual task administering section 120 erases the virtual task from the execution order stored in the job control information storing section 111, in the case where the virtual task has received an execution result of the another task indicating an abnormal end.

The virtual task generating section 121 receives an instruction from the job execution administering section 102, and generates a copy of a job or task whose execution condition or dependency relation has been revised, as a virtual task. Specifically, the virtual task generating section 121 generates a virtual task for executing a process which should have been executed by a job or task.

The virtual task registering section 122 adds control information indicating activation of a virtual task by the targeted job, to the job control information stored in the job control information storing section 111. Specifically, the virtual task registering section 122 registers control information of a virtual task generated by the virtual task generating section 121 in the job control information storing section 111. Further, the virtual task registering section 122 erases the job control information corresponding to the virtual task from the job control information storing section 111, in the case where execution of the virtual task generated by the virtual task generating section 121 has ended abnormally.

As described above, the execution order determining device of the first embodiment is operable to carry out an efficient job scheduling plan by holding a result indicating setting of an execution condition has succeeded or failed at the time of executing a job, and data which has been referred to at the time of discriminating an execution condition, as log information, even if the system configuration is changed. Thereby, even if the system configuration is changed in the computer system capable of concurrently executing plural jobs, an efficient job scheduling can be carried out promptly, thereby reducing an execution time.

In this embodiment, the job control information storing section 111 corresponds to an example of a task control information storing section, the job executing section 101 corresponds to an example of a task executing section, the job execution administering section 102 corresponds to an example of a task execution administering section, the virtual task administering section 120 corresponds to an example of a virtual task administering section, the job log storing section 112 corresponds to an example of a task log storing section, and the job result predicting section 104 corresponds to an example of a task result predicting section.

Next, there is described an example of a method for reducing an idle time of a client resulting from waiting for completion of initialization of a server by the client, in the information processing device including a client-server system, referring to FIGS. 5 and 6. The computer system shown in FIGS. 5 and 6 is incorporated with the execution order determining device. Further, jobs to be executed by the computer system include a server 401, a client 402 and an application 403 to be activated by the client 402.

The server 401 collectively administers the peripheral devices. For instance, the server 401 changes setting of a screen indication of a peripheral device, or requests initialization of a decoder. The client 402 activates various applications in cooperation with the server 401. For instance, the client 402 activates an application for reproducing a BD (Blu-ray Disc), and an application for controlling a GUI (Graphical User Interface).

FIG. 5 is a diagram showing an operation to be executed by the execution order determining device, in the case where a processing time required for an initialization 411 of the server 401 is shorter than a processing time required for an activation 415 of the client 402. The system configuration of the computer system shown in FIG. 5 is a system configuration at the time of initial designing.

Referring to FIG. 5, the client 402 issues a request 422 to the job execution administering section 102 after completion of the activation 415 and the initialization. Since the processing time required for the initialization 411 of the server 401 is shorter than the processing time required for the activation 415 of the client 402, the server 401 has already started a service execution 412 by the time when the request 422 is issued from the client 402 to the job execution administering section 102. Accordingly, the server 401 is allowed to execute a process in response to a request 424 from the job execution administering section 102, and return a response 426 to the job execution administering section 102, without waiting for completion of the initialization 411. Further, the client 402 is allowed to execute an activation request 425 of the application 403 without delay, upon receiving a result 427 from the job execution administering section 102.

FIG. 6 is a diagram showing an operation to be executed by the execution order determining device, in the case where the hardware configuration is changed to remarkably reduce the processing time required for the activation 415 of the client 402. In FIG. 6, since the processing time required for the initialization 411 of the server 401 is longer than the processing time required for the activation 415 of the client 402, the server 401 has not yet completed the initialization 411 at the time when the request 422 is issued from the client 402 to the job execution administering section 102. As a result, there is generated an idle time required for an initialization completion wait 413 from the point of time when the server 401 has received a request from the job execution administering section 102 to the point of time when the initialization 411 is completed.

In performing the above operation, the job execution administering section 102 hooks the request 422 issued from the client 402, and checks an execution state of the server 401, as a request source. In this arrangement, the job execution administering section 102 is allowed to know that the execution condition of the request 422 is completion of the initialization 411 by the job control information stored in the job control information storing section 111. Thereby, the job result predicting section 104 is allowed to predict that the client 402 will be brought to an initialization completion standby state during a time until the initialization 411 of the server 401 is completed.

Then, the job execution administering section 102 issues, to the client 402, a response 423 to the request 422, based on the execution result notified from the job result predicting section 104. Then, the job execution administering section 102 activates a virtual task 414 to issue the request 424 after start of the service execution 412 of the server 401.

The virtual task 414 issues the request 424 to the server 401 after start of the service execution 412, and waits for a response 426 from the server 401. Since the client 402 is allowed to promptly receive the response 423 after issuance of the request 422, a succeeding client process 416 is executable. Thereby, the client 402 is allowed to execute the activation request 425 of the application 403 without delay.

On the other hand, upon receiving a response 426 from the server 401, the virtual task 414 checks the contents of the response 423 which has been issued previously from the job execution administering section 102. The virtual bask 414 may return a result 427 to the client 402, and execute a post-process. Further alternatively, the virtual task 414 may complete the process, without returning the result 427 to the client 402. Further alternatively, the virtual task 414 may perform an error process, in the case where the contents of the response 426 do not agree with the contents of the response 423. Further alternatively, the virtual task 414 may asynchronously notify the client 402 of generation of an error, and cause the client 402 to perform an error process.

Figure 7:
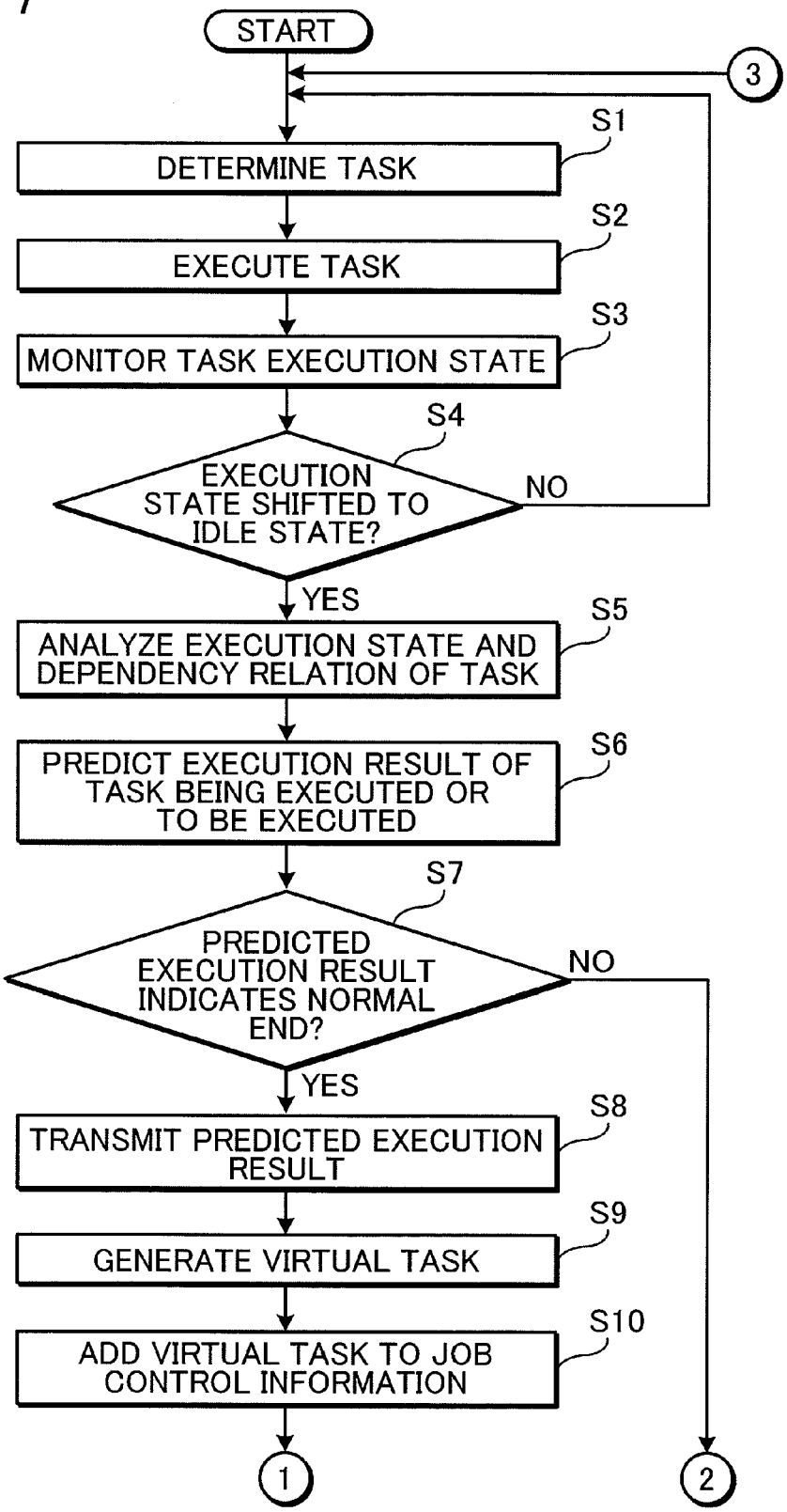
FIG. 7 is a first half of a flowchart for describing an operation to be executed by the execution order determining device in the first embodiment of the invention.
Figure 8:
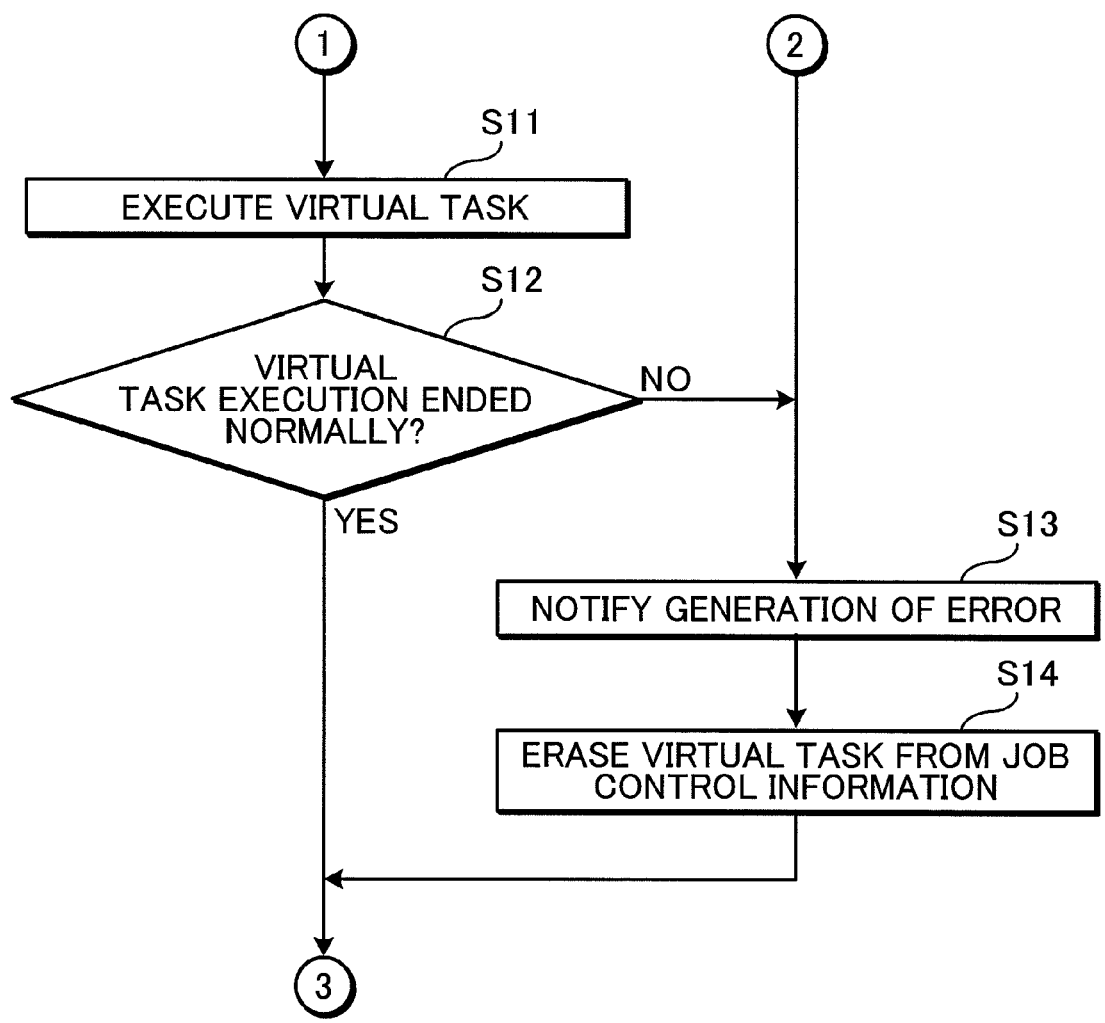
FIG. 8 is a second half of the flowchart for describing the operation to be executed by the execution order determining device in the first embodiment of the invention.

Next, an operation to be executed by the execution order determining device in the first embodiment is described. FIGS. 7 and 8 are a flowchart for describing an operation to be executed by the execution order determining device in the first embodiment of the invention.

Similarly to FIG. 6, in FIGS. 7 and 8, an operation to be executed by the execution order determining device in a server-client system is described. Specifically, a client job to be executed by a first CPU transmits a request to a server job to be executed by a second CPU different from the first CPU. The server job executes a process based on the request, and transmits an execution result to the client job. The client job instructs to execute an application upon receiving the execution result from the server job.

First, in Step S1 in FIG. 7, the scheduler 100 determines a task to be executed next, based on the tasks stored in the job control information storing section 111. Then, in Step S2, the job executing section 101 executes the task determined by the scheduler 100.

Then, in Step S3, the job execution administering section 102 monitors states of the task being executed and a task to be executed next. Then, in Step S4, the job execution administering section 102 judges whether the task state is shifted from an execution state to an idle state, based on an execution condition or a dependency relation of the task stored in the job control information storing section 111. If it is judged that the task state is not shifted from an execution state to an idle state (NO in Step S4), the routine returns to Step S1.

If, on the other hand, it is judged that the task state is shifted from an execution state to an idle state (YES in Step S4), in Step S5, the job condition analyzing section 103 analyzes the execution condition and the dependency relation of the task, based on the job control information stored in the job control information storing section 111. For instance, in the case where a task of an initialization process is being executed, the job condition analyzing section 103 judges that a task of a next service execution process cannot be executed, unless the initialization process is completed. Further, for instance, in the case where a task of a service execution process is being executed, the service execution process being executed may have a dependency relation to another service execution process. In view of this, in the case where a task of a service execution process is being executed, the job condition analyzing section 103 analyzes a dependency relation between the service execution process being executed, and another service execution process.

Then, in Step S6, the job result predicting section 104 predicts an execution result of the task being executed or to be executed, based on the execution condition and the dependency relation of the task which have been analyzed by the job condition analyzing section 103, and the log information stored in the job log storing section 112.

Then, in Step S7, the job execution administering section 102 judges whether the execution result predicted by the job result predicting section 104 indicates a normal end. In this example, if it is judged that the predicted execution result does not indicate a normal end (NO in Step S7), the routine proceeds to Step S14 in FIG. 8.

If, on the other hand, it is judged that the predicted execution result indicates a normal end (YES in Step S7), in Step S8, the job execution administering section 102 transmits an execution result predicted by the job result predicting section 104 to the task whose state is judged to be shifted from an execution state to an idle state. Then, the job execution administering section 102 instructs the virtual task generating section 121 to generate a virtual task.

In this embodiment, the job result predicting section 104 predicts an execution result of a task being executed or to be executed, based on the execution condition and the dependency relation of the task which have been analyzed by the job condition analyzing section 103, and the log information stored in the job log storing section 112. The invention is not specifically limited to the above. For instance, dependency relations and execution results of tasks may be stored in advance in the job control information storing section 111 in correlation to each other, and the job execution administering section 102 may determine an execution result, referring to the dependency relations of the tasks stored in the job control information storing section 111.

Then, in Step S9, the virtual task generating section 121 generates a virtual task, as a copy of the task whose state is judged to be shifted from an execution state to an idle state. For instance, in the arrangement shown in FIG. 6, a task, as a copy of the client process 416 of the client 402, is generated as a virtual task.

Then, in Step S10, the virtual task registering section 122 additionally records the generated virtual task in the job control information storing section 111. In performing this operation, the virtual task registering section 122 stores, into the job control information storing section 111, an execution order of the virtual task, an execution condition under which the virtual task is executed, and an execution result predicted by the job result predicting section 104 in correlation to each other. Additionally recording the generated virtual task in the job control information storing section 111 enables to execute the virtual task registered in the job control information, without performing a task analysis and a task execution result prediction, in the case where a task identical to the task whose state is judged to be shifted to an idle state this time is executed.

Then, in Step S11 in FIG. 8, the job executing section 101 executes the virtual task. In performing this operation, the scheduler 100 determines the virtual task as a task to be executed next, based on the job control information stored in the job control information storing section 111. The job executing section 101 executes the virtual task. The job executing section 101 executes the virtual task determined by the scheduler 100.

Then, in Step S12, the job execution administering section 102 judges whether execution of the virtual task has ended normally. Specifically, the job execution administering section 102 judges whether the execution result predicted by the job result predicting section 104 agrees with an execution result to be notified by actual execution of a task. If it is judged that the two execution results agree with each other, the job execution administering section 102 judges that execution of the virtual task has ended normally. If, on the other hand, it is judged that the two execution results do not agree with each other, the job execution administering section 102 judges that execution of the virtual task has not ended normally.

In this example, if it is judged that execution of the virtual task has ended normally (YES in Step S12), the routine returns to Step S1. Alternatively, the job execution administering section 102 may transmit, to the task whose state is judged to be shifted from an execution state to an idle state, an execution result to be notified by actual execution of a task.

If, on the other hand, it is judged that execution of the virtual task has not ended normally (NO in Step S12), or it is judged that the predicted execution result does not indicate a normal end (NO in Step S7), in Step S13, the job execution administering section 102 notifies generation of an error to the task whose state is judged to be shifted from an execution state to an idle state. The task which has received the generation of an error performs an error process.

Then, in Step S14, the virtual task registering section 122 erases the job control information relating to the virtual task from the job control information storing section 111, and the routine returns to Step S1.

In the above arrangement, the job execution administering section 102 is operable to detect generation of an idle state indicating waiting for completion of a job or task process at the time of executing a job or task; and virtually set a job and task execution condition by using an execution result predicted by the job result predicting section 104, whereby a succeeding process is promptly executable. The above arrangement enables to avoid generation of an idle time, which has been unpredicted at the time of designing a computer system or initializing a computer system. In other words, the above arrangement enables to efficiently schedule jobs and tasks of an overall computer system, and reduce a job execution time.

(Second Embodiment)

Figure 9:
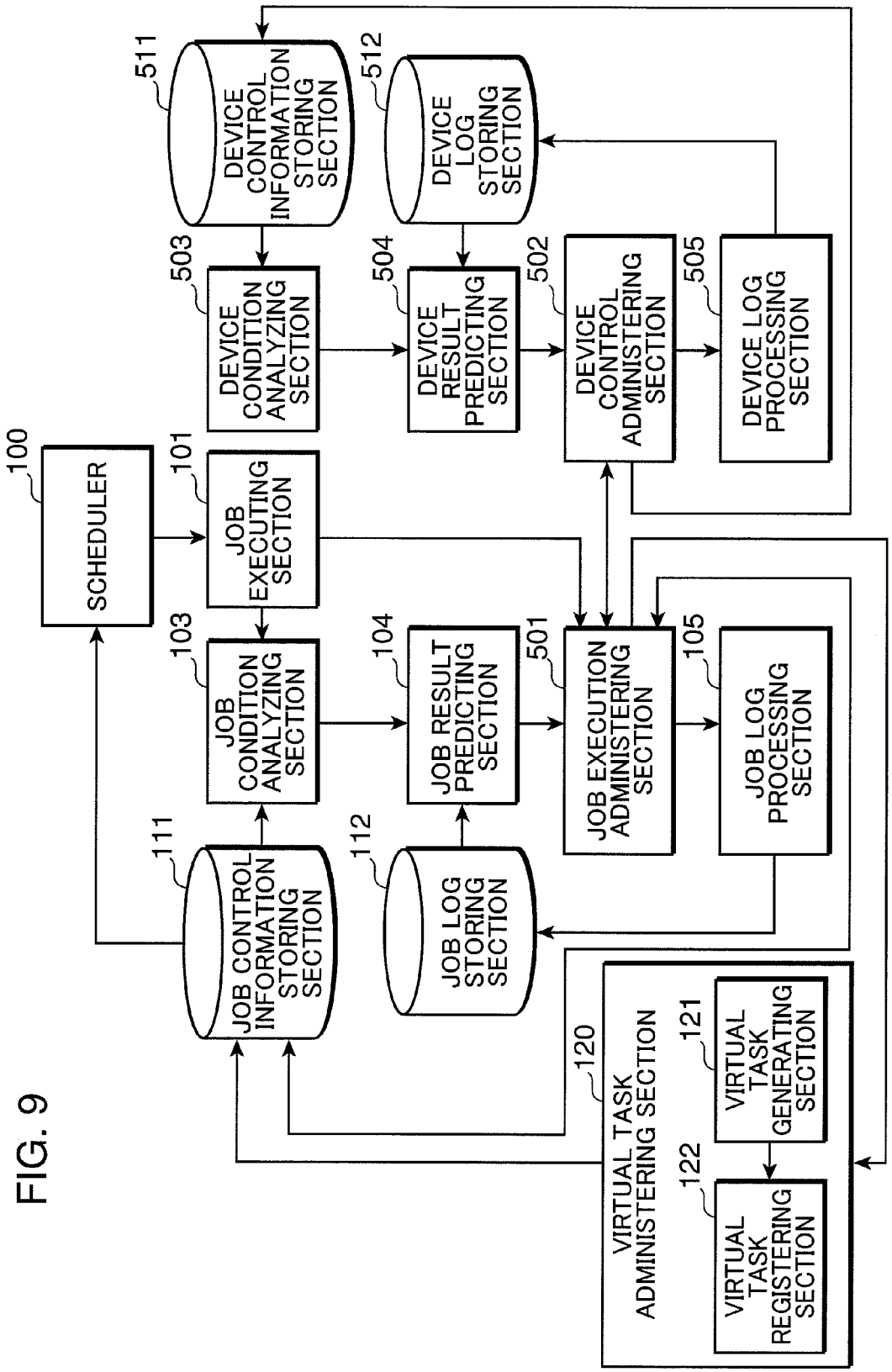
FIG. 9 is a block diagram showing an arrangement of an execution order determining device in a second embodiment of the invention.

FIG. 9 is a block diagram showing an arrangement of an execution order determining device in the second embodiment of the invention.

Referring to FIG. 9, a scheduler 100, a job executing section 101, a job condition analyzing section 103, a job result predicting section 104, a job log processing section 105, a job control information storing section 111, a job log storing section 112, and a virtual task administering section 120 having the same reference numerals as those in the first embodiment are identical to the corresponding constituent elements shown in FIG. 2.

Referring to FIG. 9, the execution order determining device shown in FIG. 9 includes a device control administering section 502, a device condition analyzing section 503, a device result predicting section 504, a device log processing section 505, a device control information storing section 511, and a device log storing section 512, in addition to the constituent elements shown in FIG. 2. The execution order determining device shown in FIG. 9 is provided with a job execution administering section 501, in place of the job execution administering section 102.

Figure 10:
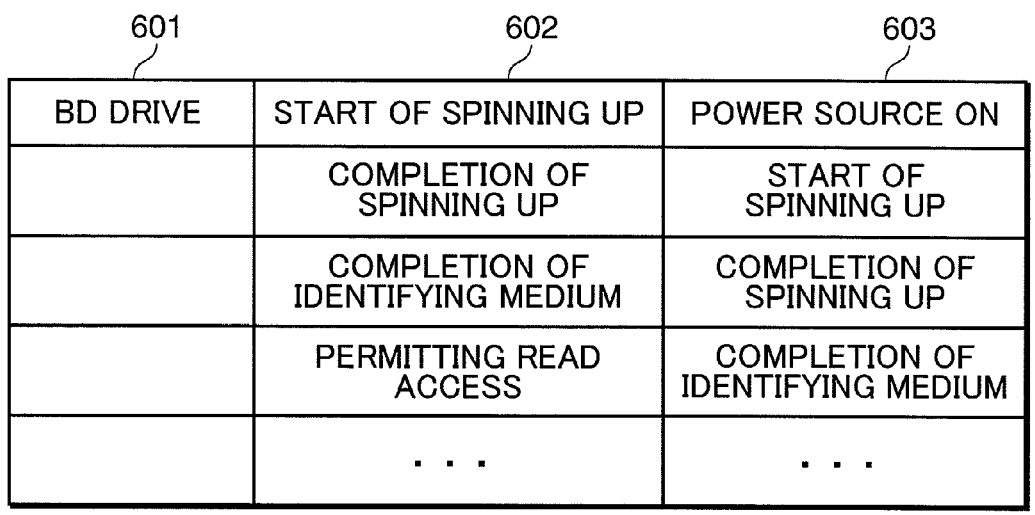
FIG. 10 is a diagram showing an example of device control information stored in a device control information storing section in the second embodiment of the invention.

The device control information storing section 511 holds device control information for designating e.g. information relating to a targeted device file or parameters for controlling peripheral devices in order to reserve control of the peripheral devices. The device control information includes a control order of peripheral devices to be executed, and information necessary for analyzing a control condition. The device control information may include identifiers for identifying peripheral devices by a computer, states of peripheral devices, and a control order of peripheral devices; and any one of description formats may be usable. FIG. 10 is a diagram showing an example of the device control information stored in the device control information storing section in the second embodiment. The device control information storing section 511 administers device identifiers 601, device states 602, and device control conditions 603 in pair.

The device control information storing section 511 stores control conditions under which control of the respective peripheral devices to be connected to the execution order determining device is started. The device control information storing section 511 stores the device control information, wherein the device identifiers 601, the device states 602, and the device control conditions 603 are correlated to each other, in the format of a table. The device control information storing section 511 stores the device identifiers 601, the device states 602, and the device control conditions 603 in the order of activation.

In FIG. 10, the device control information includes a device identifier 601 representing a BD (Blu-ray Disc) drive. The device control information also includes device states 602 representing start of spinning up, completion of spinning up, completion of identifying a medium, and permitting read access. The device state representing start of spinning up is correlated with a device control condition that the power source is turned on. This means that the drive starts spinning up under the condition that the power source has turned on. The device state representing completion of spinning up is correlated with a device control condition that the drive has started spinning up. The device state representing completion of identifying a medium is correlated with a device control condition that the drive has completed spinning up. The device state representing permitting read access is correlated with a device control condition that identifying a medium has completed.

The device condition analyzing section 503 analyzes a control condition and a dependency relation of a peripheral device, based on the device control information stored in the device control information storing section 511.

Figure 11:
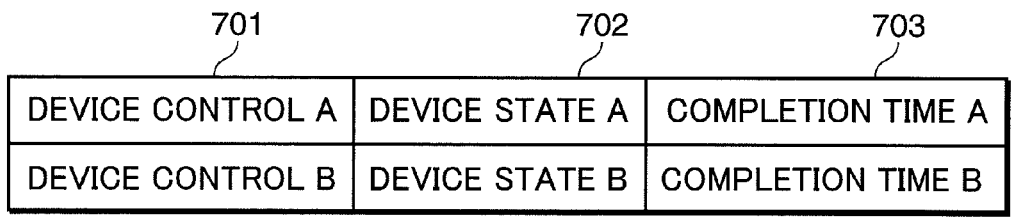
FIG. 11 is a diagram showing an example of device log information stored in a device log storing section in the second embodiment of the invention.

The device log storing section 512 stores log information including a log of a device state which is changed before and after a device control. FIG. 11 is a diagram showing an example of the log information stored in the device log storing section in the second embodiment of the invention. The log information of peripheral devices is constituted of device control records 701, device states 702, and completion times 703. The device control record 701 is an identifier for identifying a device control. The device state 702 is a state of a peripheral device which is changed before and after a device control. The completion time 703 is a time required for the device control.

The device result predicting section 504 predicts a control result of a peripheral device being executed or to be executed, using a log, and notifies the device control administering section 502 of the predicted control result. The device result predicting section 504 predicts a control result of a peripheral device being executed or to be executed, using a control condition and a dependency relation of the peripheral device, which have been analyzed by the device condition analyzing section 503, and the log information stored in the device log storing section 512.

The device control administering section 502 monitors a control state of the peripheral device, and notifies the job execution administering section 501 of a control result predicted by the device result predicting section 504. The device control administering section 502 notifies the job execution administering section 501 of the control result predicted by the device result predicting section 504 in response to a query from the job execution administering section 501, in the case where shift to a task standby state (idle state) is detected based on the control conditions or dependency relations of the respective peripheral devices. The device control administering section 502 adds control information indicating generation of a device control by a virtual task, to the device control information stored in the device control information storing section 511.

The device control administering section 502 monitors a state of the peripheral device being executed, and detects a device control whose state is shifted from an execution state indicating that a device control of controlling a peripheral device is being executed to a process standby state of waiting for a response from another peripheral device, based on the control conditions stored in the device control information storing section 511. The device control administering section 502 notifies the job execution administering section 501 of information relating to the device control, in response to detecting the device control whose state is shifted to a process standby state.

The device log processing section 505 additionally records a log of a device state which is changed before and after a device control into the device log storing section 512, as log information of a peripheral device, using the state of the peripheral device which has been notified from the device control administering section 502.

The job execution administering section 501 receives a control result from the device control administering section 502, and returns an execution result of the device control indicating a normal end, in the case where the received control result indicates a normal end, keeps the execution state of the task, and continues the processing of the job. Subsequently, the job execution administering section 501 instructs the virtual task administering section 120 to activate a virtual task, as a copy of the task which executes a device process to be skipped by virtual setting of a control condition of a peripheral device, or a device process to be skipped by cancellation of a dependency relation.

The job execution administering section 501 receives information relating to a device control from the device control administering section 502, and responds to a request of executing another device control from a device control whose state is shifted to a process standby state, in response to accepting the request from the device control whose state is shifted to a process standby state, based on the information relating to the received device control.

Similarly to the job execution administering section 102 in the first embodiment, the job execution administering section 501 monitors a state of a job and task, and notifies the job log processing section 105 of the job and task state. The job execution administering section 501 detects whether the job and task state is shifted from an execution state to a task standby state (idle state), based on an execution condition or a dependency relation of the job and task. The job execution administering section 501 receives an execution result predicted by the job result predicting section 104, in response to detecting a shift to an idle state.

In the case where the execution result predicted by the job result predicting section 104 indicates a normal end, the job execution administering section 501 informs that execution of the task indicates a normal end, keeps the execution state of the task, and continues the processing of the job. On the other hand, in the case where it is judged that the execution result predicted by the job result predicting section 104 indicates an abnormal end, the job execution administering section 501 informs that execution of the task indicates an abnormal end, and instructs to perform an error process.

Subsequently, the job execution administering section 501 instructs the virtual task administering section 120 to activate a virtual task, as a copy of the task which executes a process to be skipped by virtual setting of a job and task execution condition, or a process to be skipped by cancellation of a dependency relation. Further, the job execution administering section 501 adds control information indicating activation of a virtual task by the targeted job, to the job control information stored in the job control information storing section 111.

The virtual task administering section 120 generates a device control, as a copy of the device control whose state is detected to be shifted to a process standby state by the device control administering section 502, as a virtual task. The virtual task administering section 120 adds the generated virtual task to the execution order stored in the job control information storing section 111 to concurrently execute the virtual task with the device control whose state is shifted to a process standby state.

Similarly to the first embodiment, the virtual task generating section 121 receives an instruction from the job execution administering section 501, and generates a virtual task. The object to be instructed from the job execution administering section 501 not only includes a process which should have been executed by a job or task, but also includes a process of a peripheral device which should have been executed by a job or task. With this arrangement, the virtual task generating section 121 generates a copy of a job or task, wherein a control condition or a dependency relation of a peripheral device has been revised, as a virtual task. Specifically, the virtual task generating section 121 generates a virtual task for executing a process of a peripheral device which should have been executed by a job or tasks.

The virtual task registering section 122 adds control information indicating activation of a virtual task by the targeted job, to the job control information stored in the job control information storing section 111.

In this embodiment, the device control information storing section 511 corresponds to an example of a device control information storing section, the device control administering section 502 corresponds to an example of a device control administering section, and the job execution administering section 501 corresponds to an example of a task execution administering section.

In the above arrangement, the device control administering section 502 detects generation of an idle state corresponding to a state of waiting for completion of a device process, and notifies the job execution administering section 501 of a device control result predicted by the device result predicting section 504. Upon receiving the notification, the job execution administering section 501 virtually sets a device access by a job or task by setting the device control result as a device I/O result with respect to a job or task which has requested a device control, whereby a succeeding process is promptly executable. This arrangement enables to avoid generation of an idle time, which has been unpredicted at the time of designing a computer system or initializing a computer system. In other words, the above arrangement enables to efficiently schedule jobs and tasks of an overall computer system, and reduce a job execution time.

The above arrangement also enables to hold a result indicating setting of an execution condition has succeeded or failed at the time of executing a job, and data which has been referred to at the time of discriminating an execution condition, as log information, and detect an idle state resulting from waiting for completion of a process, based on a dependency relation between jobs and between tasks. The state of waiting for completion of a process is a state of waiting for completion of a job and task process, or a state of waiting for completion of a device process. At the time of detecting an idle state, a job and task execution condition is virtually set prior to an actual execution time, using the held log information.

Thereby, a succeeding process is promptly executable, without interrupting the job and task process resulting from waiting for a process.

Further, a virtual task as a copy of the targeted task is woken up, and a process of setting an execution condition is transferred to the virtual task in order to set the task execution condition which has been virtually set prior to an actual execution time as an execution condition which should have been set. In this arrangement, a job having a job step of waking up the virtual task is added to the job execution order, and the virtually set execution condition is removed from the job and task execution condition. This enables to efficiently schedule jobs and tasks, without the need of executing a simulation, and at the time when change of the system configuration is unpredictable.

The functional blocks of the invention are typically realized as a software. Alternatively, the functional blocks may be realized as an LSI as an integrated circuit. The functional blocks may be individually integrated into a chip unit, or a part or all of the functional blocks may be integrated into a chip unit. In the embodiments, the functional blocks are integrated into an LSL The LSI may also be called as an IC, a system LCI, a super LSI, or an ultra LSI depending on the degree of integration. The invention is not limited to integration into an LSI, but may be realized by a dedicated circuit or a general-purpose processor. Further alternatively, there may be used an FPGA (Field Programmable Gate Array) which is programmable after production of an LSI, or a re-configurable processor constructed such that connection or setting of circuit cells in an LSI is reconfigurable. Further alternatively, if an integrated circuit technology substantially equivalent to the LSI technology is established, as a result of development of the semiconductor technology or a technology derived from the semiconductor technology, the functional blocks may be integrated using the novel technology. An example of the novel integrated circuit technology substantially equivalent to the LSI technology may be an application of a biotechnology.

The aforementioned embodiments mainly include the features having the following arrangements.

An execution order determining device according to an aspect of the invention is an execution order determining device for determining an execution order of concurrently executable tasks. The execution order determining device includes: a task control information storing section which stores execution conditions under which execution of the respective tasks is started, and an execution order of the tasks; a task executing section which executes the tasks in accordance with the execution order stored in the task control information storing section; a task execution administering section which monitors a state of the task being executed to detect the task whose state is shifted from an execution state indicating that a task is being executed to a process standby state of waiting for a response from another one of the tasks, based on the execution conditions stored in the task control information storing section; and a virtual task administering section which generates a virtual task as a copy of the task whose state is detected to be shifted to the process standby state by the task execution administering section. The task execution administering section responds to a request of executing the another task from the task whose state is shifted to the process standby state, in response to accepting the request from the task whose state is shifted to the process standby state, and the virtual task administering section adds the generated virtual task to the execution order stored in the task control information storing section to concurrently execute the virtual task with the task whose state is shifted to the process standby state.

According to the above arrangement, the task control information storing section stores the execution conditions under which execution of the respective tasks is started, and the execution order of the tasks. The task executing section executes the tasks in accordance with the execution order stored in the task control information storing section. The task execution administering section monitors a state of the task being executed to detect the tasks whose state is shifted from an execution state indicating that a task is being executed to a process standby state of waiting for a response from another one of the tasks, based on the execution conditions stored in the task control information storing section. The virtual task administering section generates a virtual task as a copy of the task whose state is detected to be shifted to the process standby state by the task execution administering section. The task execution administering section responds to a request of executing the another task from the task whose state is shifted to the process standby state, in response to accepting the request from the task whose state is shifted to the process standby state. Then, the virtual task administering section adds the generated virtual task to the execution order stored in the task control information storing section to concurrently execute the virtual task with the task whose state is shifted to the process standby state.

Accordingly, a task whose state is shifted to a process standby state is executed without shifting to the process standby state, by responding to a request of executing another task from the task whose state is shifted to the process standby state, in response to accepting the request from the task whose state is shifted to the process standby state, and a virtual task as a copy of the task whose state is shifted to the process standby state is concurrently executed with execution of the task. This enables to efficiently carry out scheduling of the tasks.

Preferably, the execution order determining device may further include a device control information storing section which stores control conditions under which respective controls of peripheral devices to be connected to the execution order determining device are started, and a device control administering section which monitors a state of the peripheral device being executed to detect a device control whose state is shifted from an execution state indicating that a device control of controlling a peripheral device is being executed to a process standby state of waiting for a response from another one of the peripheral devices, based on the control conditions stored in the device control information storing section, wherein the virtual task administering section generates, as the virtual task, a device control which is a copy of the device control whose state is detected to be shifted to the process standby state by the device control administering section, the device control administering section notifies the task execution administering section of information relating to the device control, in response to detecting the device control whose state is shifted to the process standby state, the task execution administering section receives the information relating to the device control from the device control administering section, and responds to a request of executing another device control from the device control whose state is shifted to the process standby state, in response to accepting the request from the device control whose state is shifted to the process standby state, based on the received information relating to the device control, and the virtual task administering section adds the generated virtual task to the execution order stored in the task control information storing section to concurrently execute the virtual task with the device control whose state is shifted to the process standby state.

According to the above arrangement, the device control information storing section stores the control conditions under which control of the respective peripheral devices to be connected to the execution order determining device is started, and the device control administering section monitors a state of the peripheral device being executed to detect a device control whose state is shifted from an execution state indicating that a device control of controlling a peripheral device is being executed to a process standby state of waiting for a response from another one of the peripheral devices, based on the control conditions stored in the device control information storing section. The virtual task administering section generates, as the virtual task, a device control which is a copy of the device control whose state is detected to be shifted to the process standby state by the device control administering section. The device control administering section notifies the task execution administering section of information relating to the device control, in response to detecting the device control whose state is shifted to the process standby state. The task execution administering section receives the information relating to the device control from the device control administering section, and responds to a request of executing another device control from the device control whose state is shifted to the process standby state, in response to accepting the request from the device control whose state is shifted to the process standby state, based on the received information relating to the device control. Then, the virtual task administering section adds the generated virtual task to the execution order stored in the task control information storing section to concurrently execute the virtual task with the device control whose state is shifted to the process standby state.

Accordingly, a device control whose state is shifted to a process standby state is executed, without being shifted to the process standby state, in response to accepting a request of executing another device control from the device control whose state is shifted to the process standby state, and a device control as a copy of the device control whose state is shifted to the process standby state is executed, as a virtual task, concurrently with execution of the device control. This enables to efficiently carry out scheduling of the peripheral device controls.

Preferably, the execution order determining device may further include a task log storing section which stores log information including execution results indicating executions of the respective tasks, and logs of execution start and execution end of the respective tasks, and a task result predicting section which predicts an execution result of the another task, based on the execution conditions stored in the task control information storing section, and the log information stored in the task log storing section, in response to detecting the task whose state is shifted to the process standby state by the task execution administering section, wherein the task execution administering section responds to a request of executing the another task from the task whose state is shifted to the process standby state, using the execution result predicted by the task result predicting section, in response to accepting the request from the task whose state is shifted to the process standby state.

According to the above arrangement, the task log storing section stores the log information including execution results indicating execution of the respective tasks, and the logs of execution start and execution end of the respective tasks. The task result predicting section predicts an execution result of the another task, based on the execution conditions stored in the task control information storing section, and the log information stored in the task log storing section, in response to detecting the task whose state is shifted to the process standby state by the task execution administering section. The task execution administering section responds to a request of executing the another task from the task whose state is shifted to the process standby state, using the execution result predicted by the task result predicting section, in response to accepting the request from the task whose state is shifted to the process standby state.

In the above arrangement, since the execution result of the another task is predicted based on the execution conditions and the log information in response to detecting the task whose state is shifted to the process standby state. This enables to respond to a task whose state is shifted to a process standby state, using a predicted execution result, even if the task whose state is shifted to the process standby state is generated as a result of changing the configuration of a system.

In the execution order determining device, preferably, the virtual task administering section may erase the virtual task from the execution order stored in the task control information storing section, in the case where the virtual task has received an execution result that execution of the another task has ended abnormally.

According to the above arrangement, in the case where a virtual task has received an execution result that execution of the another task has ended abnormally, the virtual task is erased from the execution order stored in the task control information storing section. In the above arrangement, since the virtual task is not executed in the case where a task whose state is shifted to a process standby state is detected again. This enables to avoid execution of an unwanted task, thereby reducing a processing time.

An execution order determining program according to another aspect of the invention is an execution order determining program for determining an execution order of concurrently executable tasks. The execution order determining program causes a computer to function as: a task control information storing section which stores execution conditions under which execution of the respective tasks is started, and an execution order of the tasks; a task executing section which executes the tasks in accordance with the execution order stored in the task control information storing section; a task execution administering section which monitors a state of the task being executed to detect the tasks whose state is shifted from an execution state indicating that a task is being executed to a process standby state of waiting for a response from another one of the tasks, based on the execution conditions stored in the task control information storing section; and a virtual task administering section which generates a virtual task as a copy of the task whose state is detected to be shifted to the process standby state by the task execution administering section, wherein the task execution administering section responds to a request of executing the another task from the task whose state is shifted to the process standby state, in response to accepting the request from the task whose state is shifted to the process standby state, and the virtual task administering section adds the generated virtual task to the execution order stored in the task control information storing section to concurrently execute the virtual task with the task whose state is shifted to the process standby state.

According to the above arrangement, the task control information storing section stores the execution conditions under which execution of the respective tasks is started, and the execution order of the tasks. The task executing section executes the tasks in accordance with the execution order stored in the task control information storing section. The task execution administering section monitors a state of the task being executed to detect the task whose state is shifted from an execution state indicating that a task is being executed to a process standby state of waiting for a response from another one of the tasks, based on the execution conditions stored in the task control information storing section. The virtual task administering section generates a virtual task as a copy of the task whose state is detected to be shifted to the process standby state by the task execution administering section. The task execution administering section responds to a request of executing the another task from the task whose state is shifted to the process standby state, in response to accepting the request from the task whose state is shifted to the process standby state. Then, the virtual task administering section adds the generated virtual task to the execution order stored in the task control information storing section to concurrently execute the virtual task with the task whose state is shifted to the process standby state.

Accordingly, a task whose state is shifted to a process standby state is executed without shifting to the process standby state, by responding to a request of executing another task from the task whose state is shifted to the process standby state, in response to accepting the request from the task whose state is shifted to the process standby state, and a virtual task as a copy of the task whose state is shifted to the process standby state is concurrently executed with execution of the task. This enables to efficiently carry out scheduling of the tasks.

An execution order determining circuit according to another aspect of the invention is an execution order determining circuit for determining an execution order of concurrently executable tasks. The execution order determining circuit includes: a task control information storing circuit which stores execution conditions under which execution of the respective tasks is started, and an execution order of the tasks; a task executing circuit which executes the tasks in accordance with the execution order stored in the task control information storing circuit; a task execution administering circuit which monitors a state of the task being executed to detect the task whose state is shifted from an execution state indicating that a task is being executed to a process standby state of waiting for a response from another one of the tasks, based on the execution conditions stored in the task control information storing circuit; and a virtual task administering circuit which generates a virtual task as a copy of the task whose state is detected to be shifted to the process standby state by the task execution administering circuit, wherein the task execution administering circuit responds to a request of executing the another task from the task whose state is shifted to the process standby state, in response to accepting the request from the task whose state is shifted to the process standby state, and the virtual task administering circuit adds the generated virtual task to the execution order stored in the task control information storing circuit to concurrently execute the virtual task with the task whose state is shifted to the process standby state.

According to the above arrangement, the task control information storing circuit stores the execution conditions under which execution of the respective tasks is started, and the execution order of the tasks. The task executing circuit executes the tasks in accordance with the execution order stored in the task control information storing circuit. The task execution administering circuit monitors a state of the task being executed to detect the task whose state is shifted from an execution state indicating that a task is being executed to a process standby state of waiting for a response from another one of the tasks, based on the execution conditions stored in the task control information storing circuit. The virtual task administering circuit generates a virtual task as a copy of the task whose state is detected to be shifted to the process standby state by the task execution administering circuit. The task execution administering circuit responds to a request of executing the another task from the task whose state is shifted to the process standby state, in response to accepting the request from the task whose state is shifted to the process standby state. Then, the virtual task administering circuit adds the generated virtual task to the execution order stored in the task control information storing circuit to concurrently execute the virtual task with the task whose state is shifted to the process standby state.

Accordingly, a task whose state is shifted to a process standby state is executed without shifting to the process standby state, by responding to a request of executing another task from the task whose state is shifted to the process standby state, in response to accepting the request from the task whose state is shifted to the process standby state, and a virtual task as a copy of the task whose state is shifted to the process standby state is concurrently executed with execution of the task. This enables to efficiently carry out scheduling of the tasks.

An execution order determining method according to another aspect of the invention is an execution order determining method for determining an execution order of concurrently executable tasks. The execution order determining method includes: a task executing step of executing the tasks in accordance with the execution order stored in a task control information storing section which stores execution conditions under which execution of the respective tasks is started, and the execution order of the tasks; a detecting step of monitoring a state of the task being executed to detect the task whose state is shifted from an execution state indicating that a task is being executed to a process standby state of waiting for a response from another one of the tasks, based on the execution conditions stored in the task control information storing section; a virtual task generating step of generating a virtual task as a copy of the task whose state is detected to be shifted to the process standby state in the detecting step; a responding step of responding to a request of executing the another task from the task whose state is shifted to the process standby state, in response to accepting the request from the task whose state is shifted to the process standby state; and an adding step of adding the virtual task to the execution order stored in the task control information storing section to concurrently execute the virtual task generated in the virtual task generating step with the task whose state is shifted to the process standby state.

According to the above arrangement, the task control information storing section stores the execution conditions under which execution of the respective tasks is started, and the execution order of the tasks. In the task executing step, the tasks are executed in accordance with the execution order stored in the task control information storing section. In the detecting step, a state of the task being executed is monitored to detect the task whose state is shifted from an execution state indicating that a task is being executed to a process standby state of waiting for a response from another one of the tasks, based on the execution conditions stored in the task control information storing section. In the virtual task generating step, a virtual task as a copy of the task whose state is detected to be shifted to the process standby state in the detecting step is generated. In the responding step, a response is made to a request of executing the another task from the task whose state is shifted to the process standby state, in response to accepting the request from the task whose state is shifted to the process standby state. Then, in the adding step, the virtual task generated in the virtual task generating step is added to the execution order stored in the task control information storing section to concurrently execute the virtual task with the task whose state is shifted to the process standby state.

Accordingly, a task whose state is shifted to a process standby state is executed without shifting to the process standby state, by responding to a request of executing another task from the task whose state is shifted to the process standby state, in response to accepting the request from the task whose state is shifted to the process standby state, and a virtual task as a copy of the task whose state is shifted to the process standby state is concurrently executed with execution of the task. This enables to efficiently carry out scheduling of the tasks.

An information processing device according to another aspect of the invention includes the execution order determining device of any one of the above arrangements, and a peripheral device to be connected to the execution order determining device.

According to the above arrangement, a task whose state is shifted to a process standby state is executed without shifting to the process standby state, by responding to a request of executing another task from the task whose state is shifted to the process standby state, in response to accepting the request from the task whose state is shifted to the process standby state, and a virtual task as a copy of the task whose state is shifted to the process standby state is concurrently executed with execution of the task. This enables to efficiently carry out scheduling of the tasks.

The embodiments or the examples described in the section of description of embodiments are provided to clarify the technical contents of the invention. The invention should not be construed to be limited to the embodiments or the examples. The invention may be modified in various ways as far as such modifications do not depart from the spirit and the scope of the invention hereinafter defined.

Industrial Applicability

The execution order determining device, the execution order determining program, the execution order determining circuit, and the information processing device of the invention are useful in a computer system capable of concurrently executing jobs. The execution order determining device, the execution order determining program, the execution order determining circuit, and the information processing device of the invention are also useful for various household electrical devices, communications devices such as mobile phones, industrial devices, or vehicle devices, as well as large-scale computers or personal computers.

The invention claimed is:

1. An execution order determining device for determining an execution order of concurrently executable tasks, the execution order determining device comprising:
   a processor;
   a task control information storing section which stores execution conditions under which an execution of each of the tasks is started, and which stores the execution order of the tasks;
   a task executing section which executes the tasks in accordance with the execution order stored in the task control information storing section;
   a task execution administering section which monitors a state of a task being executed by a client including a processor to detect a first task whose state is to be shifted from an execution state indicating that a task is being executed to a process standby state of waiting to receive a second response signal from a second task that is in the execution state and is being executed by a server including a processor, the task execution administering section monitoring the state of the task being executed based on the execution conditions stored in the task control information storing section; and a virtual task administering section which generates a virtual task as a copy of the first task detected by the task execution administering section, wherein the task execution administering section (i) accepts a first request signal from the client for executing the second task and subsequently checks the execution state of the server (ii) generates a first response signal in response to the accepted first request signal, the first response signal being generated based on the execution state of the server, (iii) outputs the generated first response signal to the first task being executed by the client, such that the client continues to execute the first task without waiting for the server to issue the second response and (iv) activates the generated virtual task to issue a second request signal after a start of the execution of the second task by the server, wherein, upon receiving the second response from the server, the generated virtual task checks contents of the first response signal previously output by the task execution administering section and, based on a result of the checking of the contents of the first response signal (a) outputs a result to the client and executes a post-process, (b) executes the post-process without outputting the result to the client, or (c) performs an error process in a case where contents of the second response signal do not agree with the contents of the first response signal, the virtual task administering section adds the generated virtual task to the execution order stored in the task control information storing section to concurrently execute the virtual task with the first task, and the task executing section causes the client to execute the first task whose state is not to be shifted to the process standby state by receiving the second response signal, and causes the virtual task and the second task to be executed concurrently with the first task.

2. The execution order determining device according to claim 1, further comprising:

a device control information storing section which stores control conditions under which respective controls of peripheral devices to be connected to the execution order determining device are started; and a device control administering section which monitors a state of a peripheral device being executed to detect a device control whose state is to be shifted from an execution state indicating that a device control of controlling a peripheral device is being executed to a process standby state of waiting for a response signal from another one of the peripheral devices, the device control administering section monitoring the state of the peripheral device based on the control conditions stored in the device control information storing section, wherein the virtual task administering section generates, as the virtual task, a copy of the device control whose state is detected as going to be shifted to the process standby state by the device control administering section, the device control administering section notifies the task execution administering section of information relating to the device control, in response to detecting the device control whose state is to be shifted to the process standby state, the task execution administering section (i) receives the information relating to the device control from the device control administering section, and (ii) based on the received information relating to the device control, accepts a request signal for executing another device control from the device control whose state is to be shifted to the process standby state, generates the response signal in response to the accepted request signal for executing the another device control, and outputs the generated response signal to the device control whose state is to be shifted to the process standby state, the virtual task administering section adds the generated virtual task to the execution order stored in the task control information storing section to concurrently execute the virtual task with the device control whose state is to be shifted to the process standby state, and the task execution section executes the device control whose state is not to be shifted to the process standby state by receiving the response signal, and executes the virtual task and the another device control concurrently with the device control.

3. The execution order determining device according to claim 1, further comprising:

a task log storing section which stores log information including execution results of each of the tasks, and which stores logs of an execution start time and an execution end time of each of the tasks; and a task result predicting section which predicts an execution result of the second task, based on the execution conditions stored in the task control information storing section, and the log information stored in the task log storing section, in response to the task execution administering section detecting the first task, wherein the task execution administering section (i) accepts the first request signal for executing the another second task, and (ii) using the execution result predicted by the task result predicting section, generates the first response signal in response to the accepted request signal, and outputs the generated first response signal to the first task.

4. The execution order determining device according to claim 1, wherein the virtual task administering section erases the virtual task from the execution order stored in the task control information storing section, in a case where the virtual task has received an execution result that an execution of the second task has ended abnormally.

5. A non-transitory computer-readable recording medium having an execution order determining program recorded thereon, the execution order determining program being for determining an execution order of concurrently executable tasks, and the execution order determining program causing a computer to execute a method comprising:

a task control information storing step of storing, in a task control information storing section, execution conditions under which an execution of each of the tasks is started, and the execution order of the tasks;

a task executing step of executing the tasks in accordance with the execution order stored in the task control information storing section;

a task execution administering step of monitoring a state of a task being executed by a client including a processor to detect a first task whose state is to be shifted from an execution state indicating that a task is being executed to a process standby state of waiting to receive a second response signal from a second task that is in the execution state and is being executed by a server including a processor, the task execution administering step monitoring the state of the task being executed based on the execution conditions stored in the task control information storing section; and a virtual task administering step of generating a virtual task as a copy of the first task detected by the task execution administering step, wherein the task execution administering step further includes (i) accepting a first request signal from the client for executing the second task and subsequently checking the execution state of the server, (ii) generating a first response signal in response to the accepted first request signal, the first response signal being generated based on the execution state of the server, (iii) outputting the generated first response signal to the first task being executed by the client, such that the client continues to execute the first task without waiting for the server to issue the second response and (iv) activating the generated virtual task to issue a second request signal after a start of the execution of the second task by the server, wherein, upon receiving the second response from the server, the generated virtual task checks contents of the first response signal previously output by the task execution administering section and, based on a result of the checking of the contents of the first response signal (a) outputs a result to the client and executes a post-process, (b) executes the post-process without outputting the result to the client, or (c) performs an error process in a case where contents of the second response signal do not agree with the contents of the first response signal, the virtual task administering step further includes adding the generated virtual task to the execution order stored in the task control information storing section to concurrently execute the virtual task with the first task, and the task executing step further includes causing the client to execute the first task whose state is not to be shifted to the process standby state by receiving the second response signal, and causing the virtual task and the second task to be executed concurrently with the first task.

6. An execution order determining circuit for determining an execution order of concurrently executable tasks, the execution order determining circuit comprising:

a processor;

a task control information storing circuit which stores execution conditions under which an execution of each of the tasks is started, and which stores the execution order of the tasks;

a task executing circuit which executes the tasks in accordance with the execution order stored in the task control information storing circuit;

a task execution administering circuit which monitors a state of a task being executed by a client including a processor to detect a first task whose state is to be shifted from an execution state indicating that a task is being executed to a process standby state of waiting to receive a second response signal from a second task that is in the execution state and is being executed by a server including a processor, the task execution administering circuit monitoring the state of the task being executed based on the execution conditions stored in the task control information storing circuit; and a virtual task administering circuit which generates a virtual task as a copy of the first task detected by the task execution administering circuit, wherein the task execution administering circuit (i) accepts a first request signal from the client for executing the second task and subsequently checks the execution state of the server (ii) generates a first response signal in response to the accepted first request signal, the first response signal being generated based on the execution state of the server, (iii) outputs the generated first response signal to the first task being executed by the client, such that the client continues to execute the first task without waiting for the server to issue the second response and (iv) activates the generated virtual task to issue a second request signal after a start of the execution of the second task by the server, wherein, upon receiving the second response from the server, the generated virtual task checks contents of the first response signal previously output by the task execution administering section and, based on a result of the checking of the contents of the first response signal (a) outputs a result to the client and executes a post-process, (b) executes the post-process without outputting the result to the client, or (c) performs an error process in a case where contents of the second response signal do not agree with the contents of the first response signal, the virtual task administering circuit adds the generated virtual task to the execution order stored in the task control information storing circuit to concurrently execute the virtual task with the first task, and the task executing section causes the client to execute the first task whose state is not to be shifted to the process standby state by receiving the second response signal, and causes the virtual task and the second task to be executed concurrently with the first task.

7. An information processing device comprising:

the execution order determining device for determining an execution order of concurrently executable tasks; and a peripheral device to be connected to the execution order determining device, wherein the execution order determining device includes:

a processor;

a task control information storing section which stores execution conditions under which an execution of each of the tasks is started, and which stores the execution order of the tasks;

a task executing section which executes the tasks in accordance with the execution order stored in the task control information storing section;

a task execution administering section which monitors a state of a task being executed by a client including a processor to detect a first task whose state is to be shifted from an execution state indicating that a task is being executed to a process standby state of waiting to receive a second response signal from a second task that is in the execution state and is being executed by a server including a processor, the task execution administering section monitoring the state of the task being executed based on the execution conditions stored in the task control information storing section; and a virtual task administering section which generates a virtual task as a copy of the first task detected by the task execution administering section, wherein the task execution administering section (i) accepts a first request signal from the client for executing the second task and subsequently checks the execution state of the server, (ii) generates a first response signal in response to the accepted first request signal, the first response signal being generated based on the execution state of the server, (iii) outputs the generated first response signal to the first task being executed by the client, such that the client continues to execute the first task without waiting for the server to issue the second response and (iv) activates the generated virtual task to issue a second request signal after a start of the execution of the second task by the server, wherein, upon receiving the second response from the server, the generated virtual task checks contents of the first response signal previously output by the task execution administering section and, based on a result of the checking of the contents of the first response signal (a) outputs a result to the client and executes a post-process, (b) executes the post process without outputting the result to the client or c performs an error .process in a case where contents of the second response signal do not agree with the contents of the first response signal, the virtual task administering section adds the generated virtual task to the execution order stored in the task control information storing section to concurrently execute the virtual task with the first task, and the task executing section causes the client to execute the first task whose state is not to be shifted to the process standby state by receiving the second response signal, and causes the virtual task and the second task to be executed concurrently with the first task.

\* \* \* \* \*